United States Patent
Kim et al.

(10) Patent No.: US 12,260,146 B2
(45) Date of Patent: Mar. 25, 2025

(54) WEARABLE DEVICE FOR PROVIDING INFORMATION ABOUT AN APPLICATION THROUGH AN EXTERNAL DISPLAY AND METHOD OF CONTROLLING THE WEARABLE DEVICE

(71) Applicant: SAMSUNG ELECTRONICS CO., LTD., Suwon-si (KR)

(72) Inventors: Sungoh Kim, Suwon-si (KR); Choelmin Park, Suwon-si (KR); Jaeyung Yeo, Suwon-si (KR); Chungwan Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,307

(22) Filed: Sep. 14, 2023

(65) Prior Publication Data

US 2024/0094971 A1 Mar. 21, 2024

Related U.S. Application Data

(63) Continuation of application No. PCT/KR2023/012958, filed on Aug. 31, 2023.

(30) Foreign Application Priority Data

Sep. 15, 2022 (KR) .......... 10-2022-0116482
Dec. 12, 2022 (KR) .......... 10-2022-0172375

(51) Int. Cl.
*G06F 3/14* (2006.01)
*G03B 21/00* (2006.01)
(Continued)

(52) U.S. Cl.
CPC .......... *G06F 3/1423* (2013.01); *G03B 21/00* (2013.01); *G06V 40/174* (2022.01);
(Continued)

(58) Field of Classification Search
CPC ..... G03B 21/00; G06F 1/1624; G06F 1/1652; G06F 3/1423; G06F 3/147; G06F 2203/04102; G06V 40/174; G08B 21/182
See application file for complete search history.

(56) References Cited

U.S. PATENT DOCUMENTS

| 9,341,849 B2 | 5/2016 | Wong et al. |
| 11,127,182 B2 | 9/2021 | Mirhosseini et al. |

(Continued)

FOREIGN PATENT DOCUMENTS

| KR | 10-1373611 B1 | 3/2014 |
| KR | 10-2015-0056521 A | 5/2015 |

(Continued)

OTHER PUBLICATIONS

International Search Report and Written Opinion (PCT/ISA/210 and PCT/ISA/237) dated Nov. 28, 2023, issued by International Searching Authority for International Application No. PCT/KR2023/012958.

*Primary Examiner* — Mihir K Rayan
(74) *Attorney, Agent, or Firm* — Sughrue Mion, PLLC

(57) ABSTRACT

Provided is a wearable device that includes: a first display provided on a first surface of the wearable device configured to face a face of a user wearing the wearable device, and a second display provided on a second surface of the wearable device configured to face an external environment of the wearable device when the wearable device is worn by the user. The wearable device may be configured to display a first execution screen of a first application on the first display, while the wearable device is worn by the user, determine a display type for information to be displayed on the second display, while displaying the first execution screen on the first display, and display information related to the first execution screen on the second display based on the display type.

20 Claims, 17 Drawing Sheets

(51) Int. Cl.
  *G06V 40/16* (2022.01)
  *G08B 21/18* (2006.01)
  *G06F 1/16* (2006.01)
(52) U.S. Cl.
  CPC .......... *G08B 21/182* (2013.01); *G06F 1/1624* (2013.01); *G06F 1/1652* (2013.01); *G06F 2203/04102* (2013.01)

(56) References Cited

U.S. PATENT DOCUMENTS

| | | | |
|---|---|---|---|
| 11,861,255 B1* | 1/2024 | Ive | G06V 40/174 |
| 2004/0117228 A1 | 6/2004 | Iino et al. | |
| 2013/0147686 A1* | 6/2013 | Clavin | G02B 27/017 |
| | | | 345/8 |
| 2015/0253573 A1* | 9/2015 | Sako | H04N 13/398 |
| | | | 345/207 |
| 2015/0379896 A1* | 12/2015 | Yang | G09B 21/00 |
| | | | 434/112 |
| 2016/0018655 A1 | 1/2016 | Imoto et al. | |
| 2016/0109937 A1 | 4/2016 | Kim et al. | |
| 2016/0127624 A1 | 5/2016 | Woo et al. | |
| 2016/0269631 A1* | 9/2016 | Jiang | G06T 3/4038 |
| 2016/0357491 A1 | 12/2016 | Oya | |
| 2016/0364198 A1 | 12/2016 | Song et al. | |
| 2017/0068500 A1 | 3/2017 | Rochford et al. | |
| 2017/0230640 A1* | 8/2017 | Rochford | H04N 13/344 |
| 2018/0004478 A1 | 1/2018 | Chen | |
| 2018/0024799 A1* | 1/2018 | Jarvenpaa | G02B 27/0176 |
| | | | 345/156 |
| 2019/0179147 A1 | 6/2019 | Ichimura et al. | |
| 2020/0042274 A1 | 2/2020 | Park et al. | |
| 2020/0258278 A1 | 8/2020 | Mirhosseini et al. | |

FOREIGN PATENT DOCUMENTS

| | | |
|---|---|---|
| KR | 10-2016-0027627 A | 3/2016 |
| KR | 10-2016-0051384 A | 5/2016 |
| KR | 10-1899263 B1 | 11/2018 |
| KR | 10-2124748 B1 | 6/2020 |
| KR | 10-2016-0145976 A | 2/2022 |
| KR | 10-2022-0020308 A | 2/2022 |
| KR | 10-2693268 B1 | 8/2024 |

* cited by examiner

WEARABLE DEVICE FOR PROVIDING INFORMATION ABOUT AN APPLICATION THROUGH AN EXTERNAL DISPLAY AND METHOD OF CONTROLLING THE WEARABLE DEVICE

CROSS-REFERENCE TO RELATED APPLICATIONS

This application is a bypass continuation application of International Application No. PCT/KR2023/012958, which was filed on Aug. 31, 2023, and claims priority to Korean Patent Application No. 10-2022-0116482, filed on Sep. 15, 2022, and to Korean Patent Application No. 10-2022-0172375, filed on Dec. 12, 2022, in the Korean Intellectual Property Office, the disclosures of which are incorporated herein by reference in their entireties.

BACKGROUND

1. Field

The disclosure relates to a wearable device for providing information through an external display about an application (e.g., a running application) on the wearable device, and a method of controlling the wearable device.

2. Description of Related Art

More and more services and additional functions are provided through an electronic device, for example, a portable electronic device such as a wearable device providing virtual reality. To increase the utility of electronic devices and satisfy various user demands, communication service providers or electronic device manufacturers are competitively developing electronic devices for the purpose of providing various functions and differentiating them from other companies. Accordingly, various functions provided through electronic devices are advanced.

A wearable device (e.g., a wearable device for providing virtual reality or augmented reality) may provide a function or operation of recognizing danger around a user using the wearable device and notifying the user of the danger. However, when the user uses specific content through the wearable device in a state where the user's view is blocked, not only the user of the wearable device but also other people or devices around the user may be placed in a dangerous situation such as collisions due to the user's movement of the wearable device. Moreover, since people located around the user of the wearable device do not know what content the user of the wearable device is using, it may be more difficult to predict the movement of the user of the wearable device.

SUMMARY

According to an aspect of the disclosure, a wearable device includes: a first display disposed on a first surface of the wearable configured to face a face of a user wearing the wearable device; a second display disposed on a second surface of the wearable device configured to face an external environment of the wearable device when the wearable device is worn by the user; a memory storing one or more instructions; and at least one processor configured to execute the one or more instructions to: display a first execution screen of a first application on the first display device, while the wearable device is worn by the user, determine a display type for information to be displayed on the second display device, while displaying the first execution screen on the first display device, and display information related to the first execution screen on the second display based on the display type.

The at least one processor may be further configured to execute the one or more instructions to: obtain a user input for the display type; and determine the display type based on the user input.

The wearable device may include: a communication module, wherein the at least one processor may be further configured to execute the one or more instructions to transmit the information related to the first execution screen to an external electronic device operably connected to the wearable device through the communication module to enable the information related to the first execution screen to be displayed on the external electronic device.

The at least one processor may be further configured to execute the one or more instructions to: obtain information about an emotional expression of the user wearing the wearable device through at least one sensor; and display a visual object corresponding to the emotional expression of the user on the second display.

The at least one processor may be further configured to execute the one or more instructions to: display information about at least one item obtained through the first application by the user on the second display device.

The wearable device may include: a projection module, wherein the at least one processor may be further configured to execute the one or more instructions to provide information about a predicted user motion range through the projection module, while displaying the information related to the first execution screen through the second display device.

The at least one processor may be further configured to execute the one or more instructions to: provide information about a predicted user motion direction through the projection module, while displaying the information related to the first execution screen on the second display.

The wearable device may include: a proximity sensor, wherein the at least one processor may be further configured to execute the one or more instructions to: identify that an external object approaches the wearable device through the proximity sensor, and display a warning message on the second display based on the identification of the external device.

The at least one processor may be further configured to execute the one or more instructions to: identify that the external object approaches the wearable device through the proximity sensor; and transmit information about the warning message to the external electronic device operably connected to the wearable device through the communication module based on the identification of the external object to enable the warning message to be output through the external electronic device.

The at least one processor may be further configured to execute the one or more instructions to: transmit information about a first area in the external environment of the wearable device to the external electronic device operably connected to the wearable device to enable the information about the first area to be output through the external electronic device.

According to an aspect of the disclosure, a method of controlling a wearable device, includes: displaying a first execution screen of a first application on a first display of the wearable device, while the wearable device is worn by a user; determining a display type for information to be displayed on a second display of the wearable device, while displaying the first execution screen on the first display device; and displaying information related to the first execution screen on the second display based on the display type.

The method may include: obtaining a user input for the display type; and determining the display type based on the user input.

The method may include: transmitting the information related to the first execution screen to an external electronic device operably connected to the wearable device through a communication module to enable the information related to the first execution screen to be displayed on the external electronic device.

The method may include: obtaining information about an emotional expression of the user wearing the wearable device through at least one sensor; and displaying a visual object corresponding to the emotional expression of the user on the second display.

The method may include: displaying information about at least one item obtained through the first application by the user on the second display.

The method may include: providing information about a predicted user motion range through a projection module, while displaying the information related to the first execution screen on the second display.

The method may include: providing information about a predicted user motion direction through a projection module, while displaying the information related to the first execution screen on the second display.

The method may include: identifying that an external object approaches the wearable device through a proximity sensor; and displaying a warning message on the second display based on the identification of the external device.

The method may include: identifying that an external object approaches the wearable device through a proximity sensor; and transmitting information about the warning message to an external electronic device operably connected to the wearable device through a communication module based on the identification of the external object to enable the warning message to be output through the external electronic device.

The method may include: transmitting information about a first area in the external environment of the wearable device and the wearable device to an external electronic device operably connected to the wearable device to enable the information about the first area to be output through the external electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
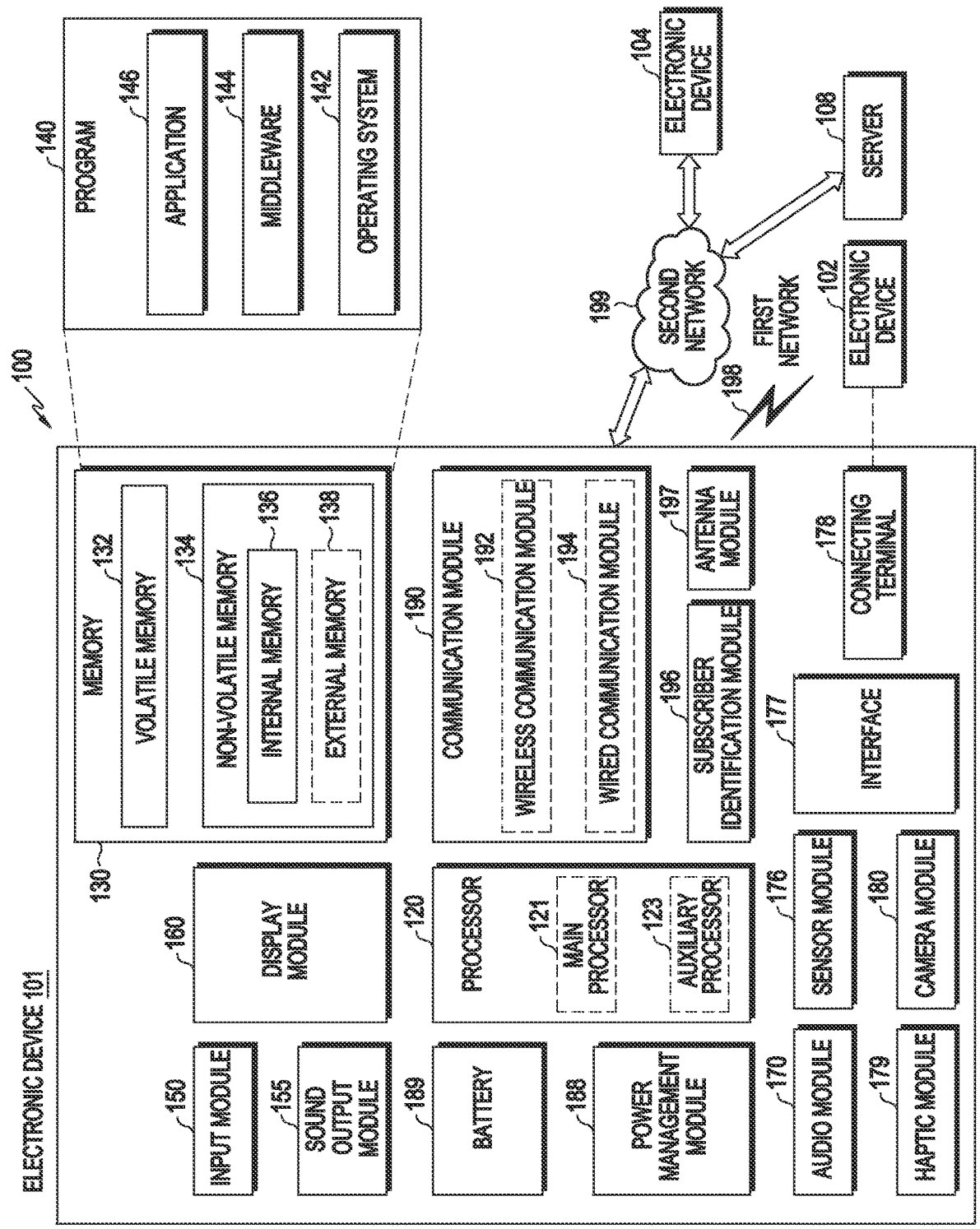
FIG. 1 is a block diagram illustrating an electronic device in a network environment according to various embodiments.

Hereinafter, embodiments of the present disclosure will be described in detail with reference to the accompanying drawings, where similar reference characters denote corresponding features consistently throughout.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
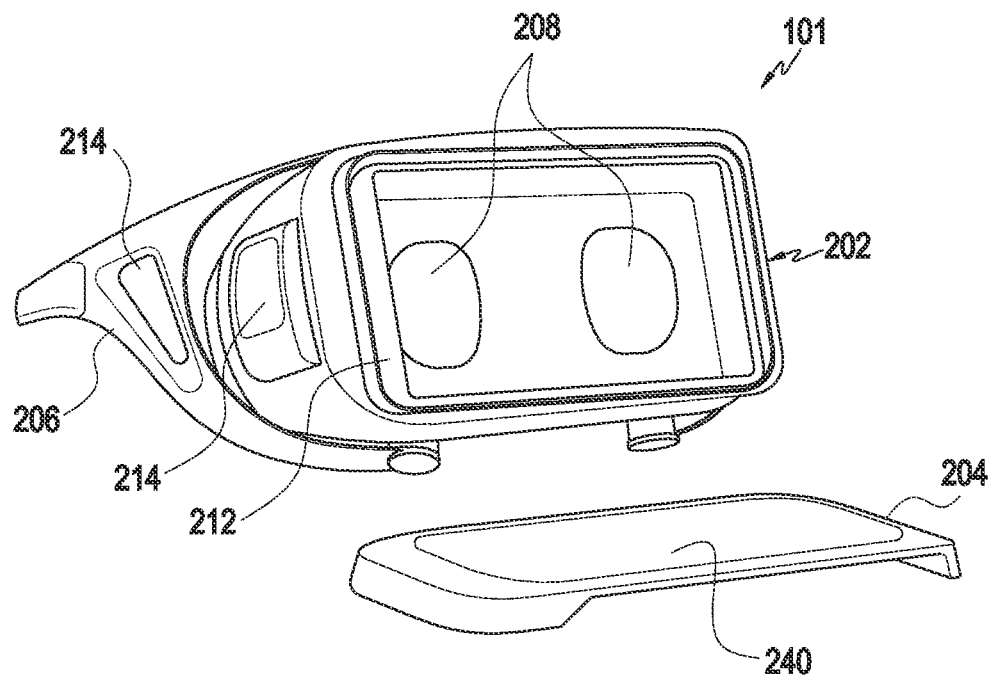
FIGS. 2A, 2B, and 2C are diagrams illustrating a wearable device according to an embodiment.
Figure 2B:
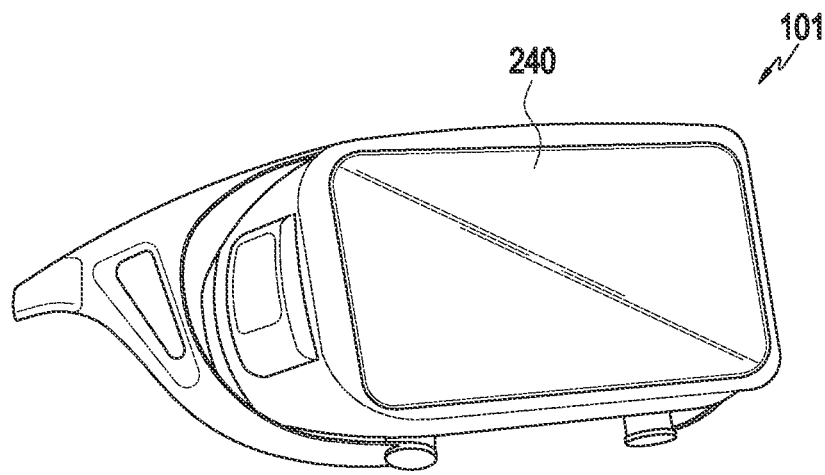
Figure 2C:
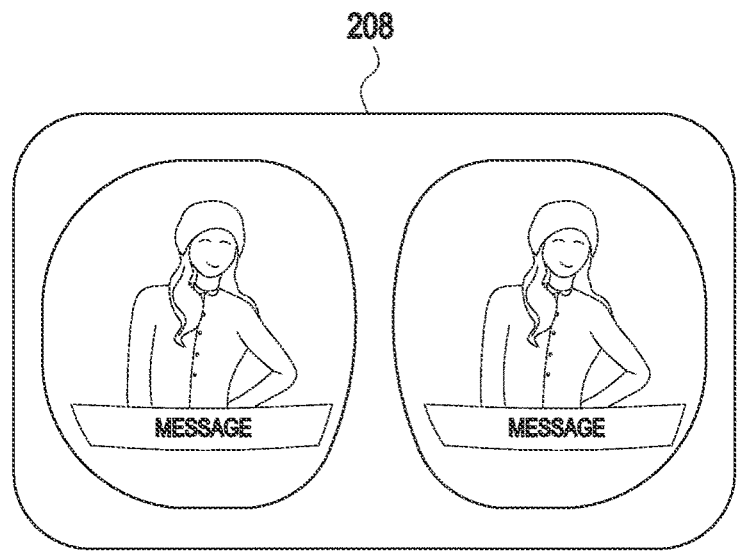

FIGS. 2A, 2B, and 2C are diagrams illustrating a wearable device 200 (e.g., the electronic device 101) according to an embodiment.

Referring to FIGS. 2A, 2B, and 2C, the electronic device 101 may include a body 202 and a cover 204. The body 202 may include at least one of a support structure 206, at least one display device (e.g., a first display 208), a cover mounting structure 212, or a control module 214. The cover 204 may also include at least one display device (e.g., a second display 240). The cover 204 may include an electrical/physical structure connected to the body 202 to drive the second display 240. According to an embodiment of the disclosure, the body 202 and the cover 204 may be integrally implemented. The support structure 206 may include a mechanical structure that may be used for a user to wear the electronic device 100 on the head. The at least one display (e.g., the first display 208) may be provided at a position corresponding to each of the positions of the user's eyes. The at least one display (e.g., the first display 208) may be implemented as a plurality of (e.g., two) displays or as a single flat panel display as illustrated in FIG. 2C. The electronic device 101 may further include at least one lens corresponding to the at least one display (e.g., the first display 208). The control module 214 may be provided on a side surface of the body 202. The control module 214 may be used to obtain an input for controlling the electronic device 101 from the user. For example, the control module 214 may include at least one of a touch panel, a button, a wheel key, or a touch pad. The electronic device 101 may adjust the sound volume of content being output or control image reproduction, based on the input obtained through the control module 214. To provide virtual reality, the electronic device 101 may separately provide a screen corresponding to the left eye of the user wearing the electronic device 101 and a screen corresponding to the right eye of the user, as illustrated in FIG. 2C. The electronic device 101 may include a hole. A strap fixing the electronic device 101 to the user's head may be provided through the hole 216.

Figure 3:
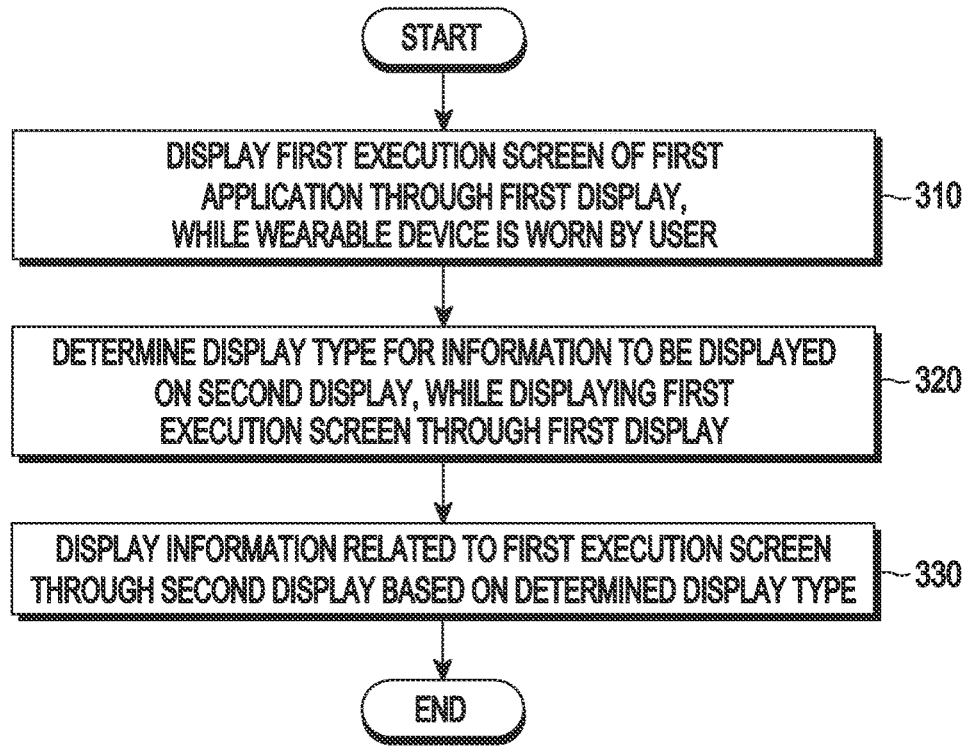
FIG. 3 is a diagram illustrating a function or operation of displaying information related to a first execution screen through a second display in a wearable device according to an embodiment.

FIG. 3 is a diagram illustrating a function or operation of displaying information related to a first execution screen through the second display 240 in the wearable device 200 (e.g., the electronic device 101 of FIG. 1) according to an embodiment.

Referring to FIG. 3, in operation 310, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 320, the wearable device 200 may determine a display type for information to be displayed on the second display 240 while displaying the first execution screen through the first display 208. The wearable device 200 may determine the display type for the information to be displayed on the second display 240 based on a user input. For example, when obtaining a user input for displaying a current screen being displayed on the first display 208 through the second display 240 as it is from the user, the wearable device 200 may display the screen being displayed on the first display 208 through the second display 240 as it is. Alternatively, when obtaining a user input for displaying only summary information (e.g., the title of a video being displayed) of a current screen being displayed on the first display 208 through the second display 240 from the user, the wearable device 200 may display the summary information of the current screen being displayed on the first display 208 through the second display 240. According to an embodiment of the disclosure, the user input for determining the display type to be displayed on the second display 240 may be obtained preliminarily (e.g., before displaying the first execution screen) or while displaying the first execution screen. The wearable device 200 may determine a display type for information to be displayed on the second display 240 based on the current location of the user. For example, when determining that the user is currently located in a public place (e.g., a department store, a company, or the like), the wearable device 200 may display the summary information or no information on the second display 240. When determining that the user is located in a private place (e.g., the user's home), the wearable device 200 may display a screen corresponding to the screen being displayed on the first display 208 through the second display 240. The wearable device 200 may determine the current location of the user through at least one sensor (e.g., an inertial measurement unit (IMU) sensor, a GPG sensor, or the like) included in the wearable device 200, and determine whether the current location is a public place or a private place or a private place. When the wearable device 200 includes at least one camera having a sensor (e.g., a complementary metal oxide semiconductor (CMOS) sensor) exposed to the outside, the wearable device 200 may determine whether the current location is a public place or a private place, further based on an image captured by the at least one camera. For example, when a specified number of or more external objects (e.g., nearby people) are in an image captured by the at least one camera, the wearable device 200 may determine that the current location is a public place. Alternatively, the wearable device 200 may determine whether the current location is a public place or a private place based on the characteristics (e.g., the name of a specific company, the interior layout of a building, or the like) of a captured external object. For example, the wearable device 200 may determine whether the current location is a public place or a private place by comparing an image pre-stored in the wearable device 200 with a captured image. The wearable device 200 may determine whether the current location is a public place or a private place according to an input obtained preliminarily from the user. For example, when the user has designated a specific location (e.g., 129 Samseong-ro, Yeongtong-gu, Suwon-si, Gyeonggi-do) as a public place (e.g., a company), and the wearable device 200 is located at the specific location (e.g., 129 Samseong-ro, Yeongtong-gu, Suwon-si, Gyeonggi-do), the wearable device 200 may determine the current location as a "public place".

Figure 4A:
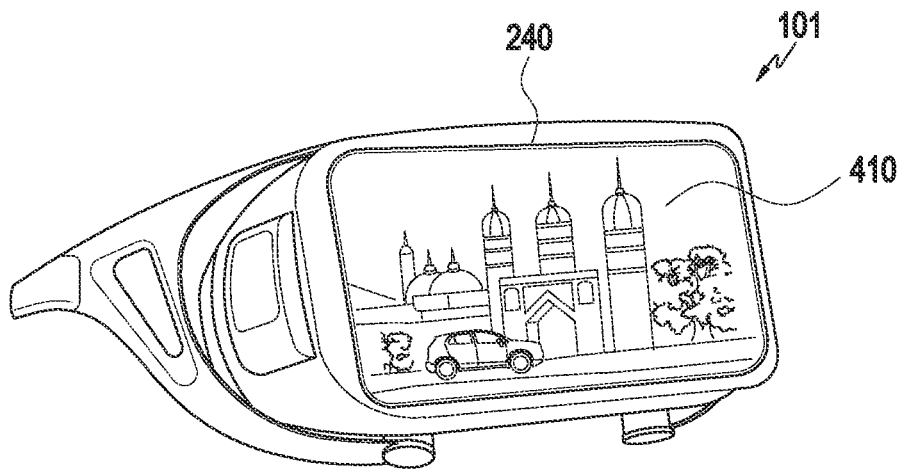
FIGS. 4A and 4B are diagrams illustrating information related to a first execution screen displayed through a second display in a wearable device according to an embodiment.
Figure 4B:
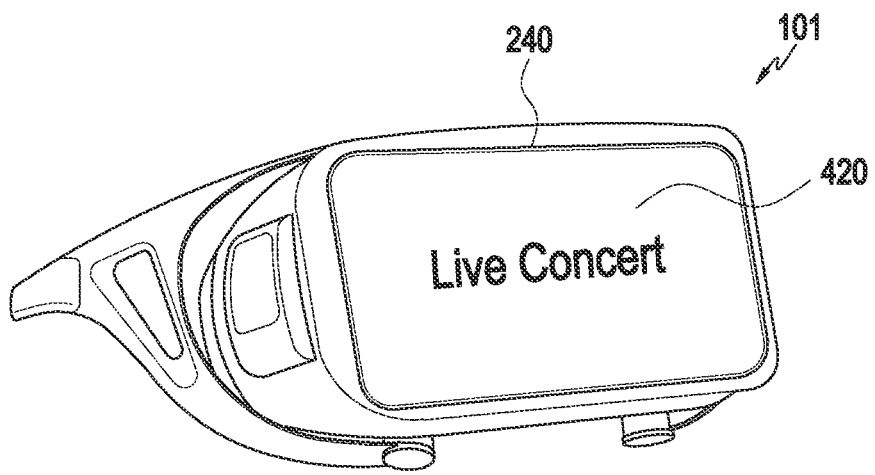

In operation 330, the wearable device 200 may display information related to the first execution screen through the second display 240 based on the display type determined in operation 320. For example, the wearable device 200 may display the screen being displayed on the first display 208 through the second display 240 as it is. Alternatively, the wearable device 200 may display the summary information (e.g., the title of a video being played) of the current being displayed on the first display 208 through the second display 240. FIGS. 4A and 4B are diagrams illustrating information related to a first execution screen displayed through the second display 240 in the wearable device 200 according to an embodiment. In FIG. 4A, an embodiment in which a screen corresponding to the screen being displayed through the first display 208 is displayed through the second display 240 is illustratively illustrated. In FIG. 4B, an embodiment in which the summary information (e.g., the title of a video being played) of the screen being displayed on the first display 208 is displayed through the second display 240 is illustratively illustrated.

Figure 5:
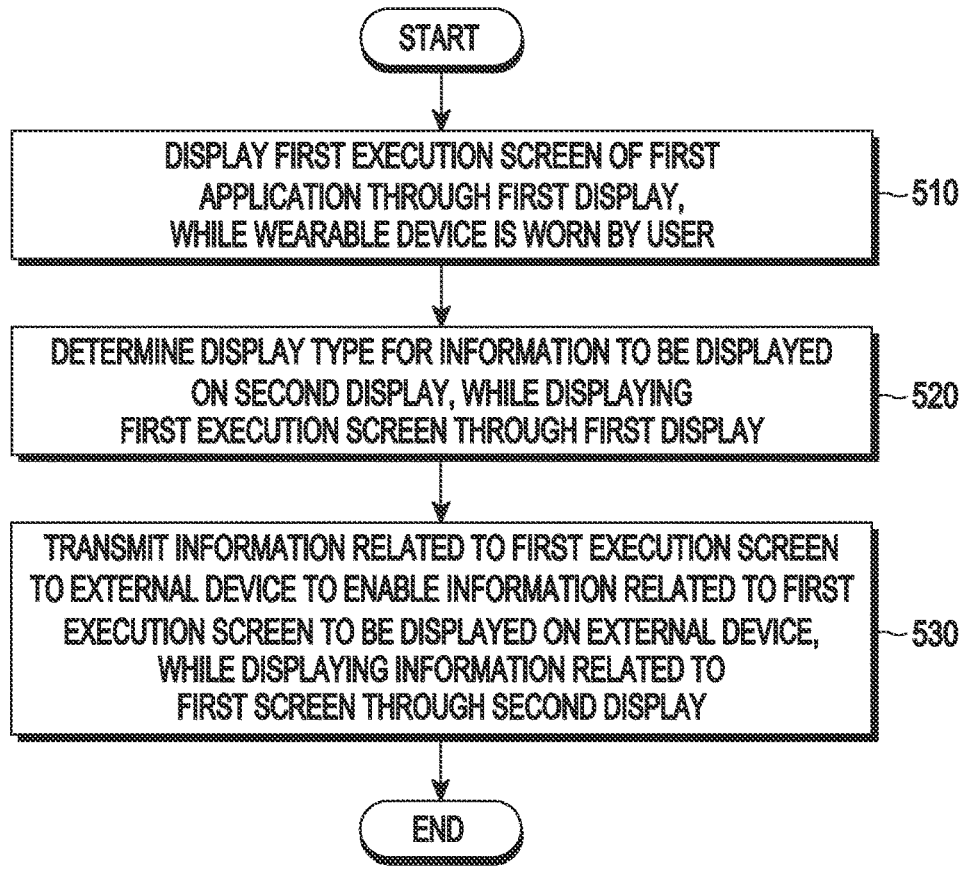
FIG. 5 is a diagram illustrating a function or operation of displaying information related to a first execution screen through an external electronic device operably connected to a wearable device according to an embodiment.
Figure 6:
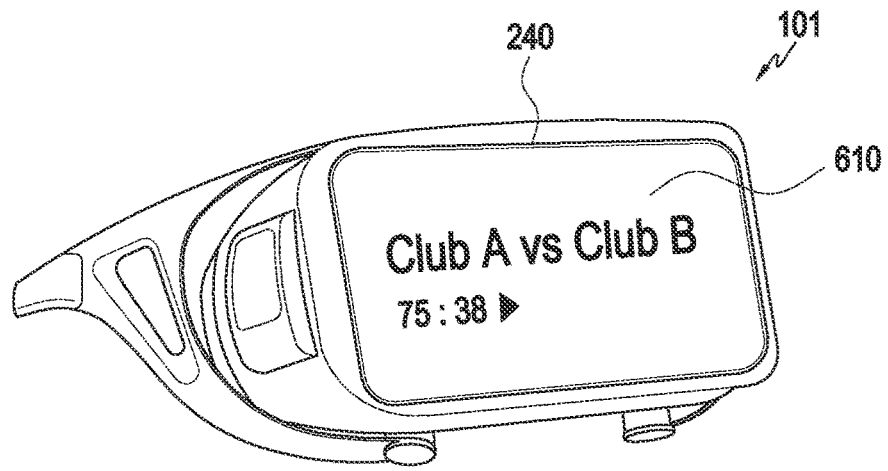
FIG. 6 is a diagram illustrating information related to a first execution screen according to an embodiment.

FIG. 5 is a diagram illustrating a function or operation of displaying information related to a first execution screen through an external electronic device 1610 operably connected to the wearable device 200 according to an embodiment. FIG. 6 is a diagram illustrating information related to a first execution screen according to an embodiment.

Referring to FIG. 5, in operation 510, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 520, the wearable device 200 may determine a display type for information to be displayed on the second display 240 while displaying the first execution screen through the first display 208. The wearable device 200 may determine the display type for the information to be displayed on the second display 240 based on a user input. The description of operation 320 may be equally applied to operation 520.

In operation 530, while displaying information related to the first execution screen through the second display 240, the wearable device 200 may transmit the information related to the first execution screen to the external electronic device 1610 so that the external electronic device 1610 displays the information related to the first execution screen. The external electronic device 1610 may be operably connected to the wearable device 200 through short-range communication or the like. The wearable device 200 may transmit the information related to the first execution screen to the external electronic device 1610 to cause the external electronic device 1610 to display the information (e.g., the title of a video being played) related to the first execution screen as illustrated in FIG. 6. The external electronic device 1610 may display the information related to the first execution screen based on the information obtained from the wearable device 200.

Figure 7:
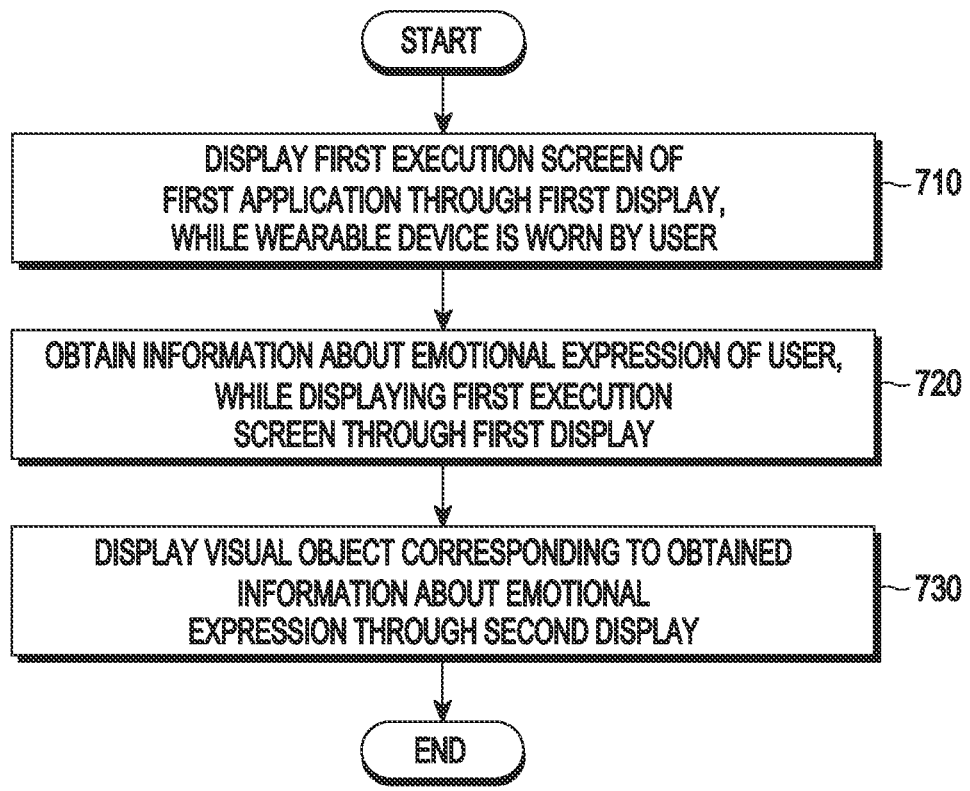
FIGS. 7 and 8 are diagrams illustrating a function or operation of displaying a visual object corresponding to an emotional expression of a user through a second display in a wearable device according to an embodiment.
Figure 8:
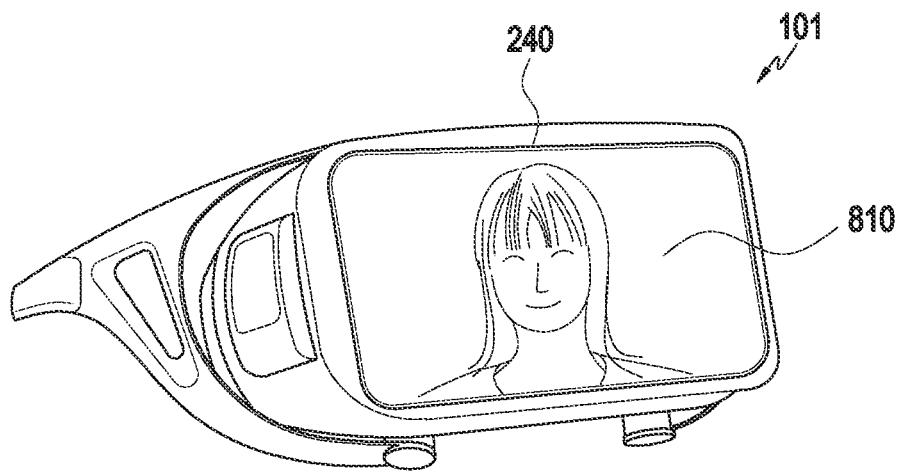

FIGS. 7 and 8 are diagrams illustrating a function or operation of displaying a visual object 810 corresponding to an emotional expression of a user through the second display 240 in the wearable device 200 according to an embodiment.

Referring to FIG. 7, in operation 710, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The wearable device 200 may determine whether external objects (e.g., people) exist around the user wearing the wearable device 200 through at least one sensor (e.g., a proximity sensor and/or a motion recognition sensor (e.g., at least one CMOS sensor)). The wearable device 200 may determine whether external objects (e.g., people) exist around the user wearing the wearable device 200 based on data sensed by at least one proximity sensor disposed outside of the housing. Alternatively, the wearable device 200 may determine whether external objects (e.g., people) exist around the user wearing the wearable device 200 based on data sensed by at least one motion recognition sensor disposed outside of the housing. The first application may include various applications such as an Internet application and a video application.

In operation 720, the wearable device 200 may obtain information about an emotional expression of the user, while displaying the first execution screen through the first display 208. The wearable device 200 may include at least one camera for recognizing a facial expression of the user. The wearable device 200 may include at least one camera for recognizing a user gesture (e.g., a hand motion). According to an embodiment of the disclosure, when the wearable device 200 is worn by the user, the at least one camera for recognizing a facial expression of the user may be disposed to face the user's face in order to capture a face area of the user. According to an embodiment of the disclosure, the at least one camera for recognizing a user gesture (e.g., a hand motion) may be disposed to face an external environment of the wearable device 200 in order to capture a user gesture. The wearable device 200 may obtain a facial expression of the user and/or a user gesture through the at least one camera as information indicating an emotional expression of the user. The first execution screen may include a message application, and the user may transmit an emoticon representing a specific emotional expression to the other party through the message application. The wearable device 200 may obtain an emotion corresponding to the emoticon input by the user as an emotional expression of the user. The first execution screen may include at least one avatar set by the user. The wearable device 200 may control the first display 208 to represent an expression corresponding to a facial expression of the user obtained by the at least one camera by an avatar.

In operation 730, the wearable device 200 may display the visual object 810 corresponding to the information about the emotional expression obtained in operation 720 through the second display 240. When a smiling expression is obtained by the at least one camera, the wearable device 200 may display the visual object 810 (e.g., an avatar's face) having the smiling expression through the second display 240. When the user transmits a smiley emoticon to the other party through the message application, the wearable device 200 may display the visual object 810 (e.g., an avatar's face) having the smiling expression through the second display 240. When a "thumbs up" gesture is obtained by the at least one camera, the wearable device 200 may display an emoticon representing the "thumbs up" gesture through the second display 240.

Figure 9:
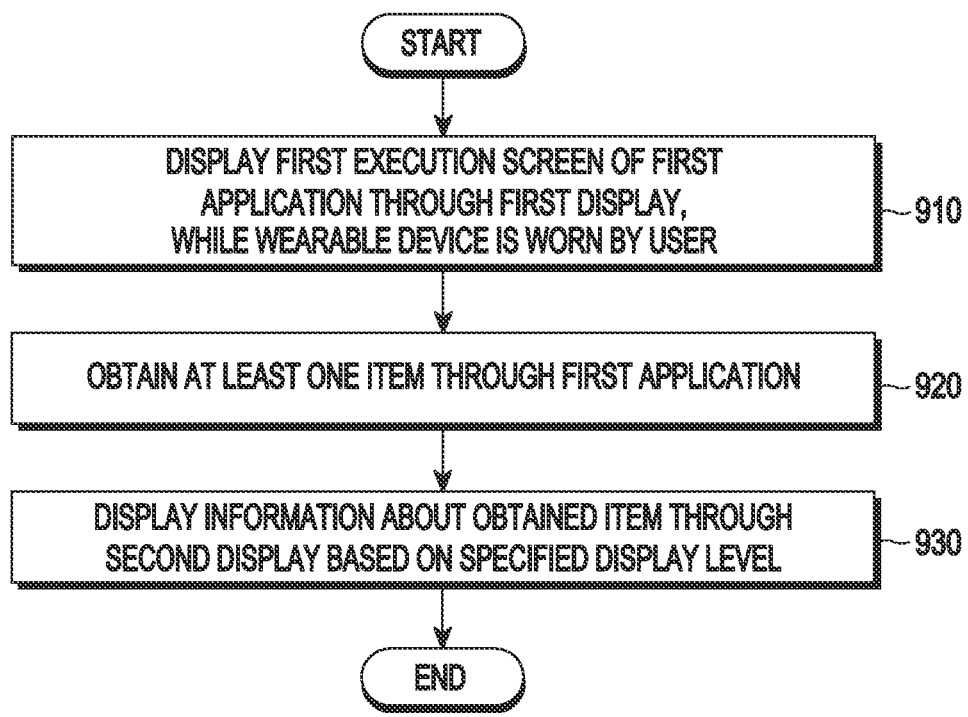
FIGS. 9 and 10 are diagrams illustrating a function or operation of displaying information about at least one item obtained by a user through a second display in a wearable device according to an embodiment.
Figure 10:
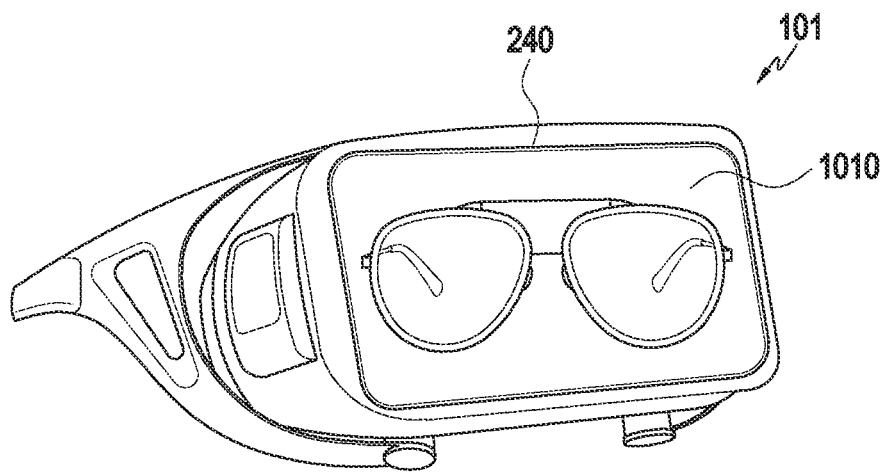

FIGS. 9 and 10 are diagrams illustrating a function or operation of displaying information about at least one item obtained by a user through the second display 240 in the wearable device 200 according to an embodiment.

Referring to FIG. 9, in operation 910, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 920, the wearable device 200 may obtain at least one item through the first application. For example, when the user purchases glasses through a game application, the wearable device 200 may store information about the glasses as at least one obtained item in the wearable device 200.

In operation 930, the wearable device 200 may display information 1010 about the obtained item through the second display 240 based on a specified display level. The specified display level may be set by the user or based on the current location of the wearable device 200. For example, when a low display level is set by the user, the wearable device 200 may display an image of the glasses as the information 1010 about the obtained item through the second display 240, as illustrated in FIG. 10. For example, when a high display level is set by the user, the wearable device 200 may display no information through the second display 240, even though the user has purchased the glasses through the game application. For example, when the user is currently located in a private place, the wearable device 200 may display the image of the glasses as the information 1010 about the obtained item through the second display 240, as illustrated in FIG. 10. For example, when the user is currently located in a public place, the wearable device 200 may display no information through the second display 240, even though the user has purchased the glasses through the game application.

Figure 11A:
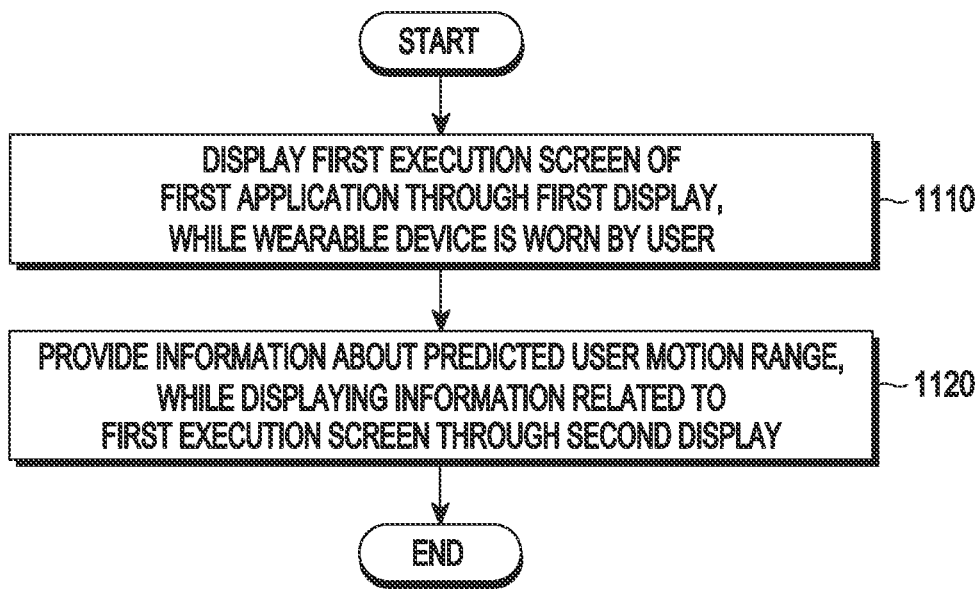
FIG. 11A is a diagram illustrating a function or operation of providing information about a predicted motion range of a user through a projection module in a wearable device according to an embodiment.
Figure 11B:
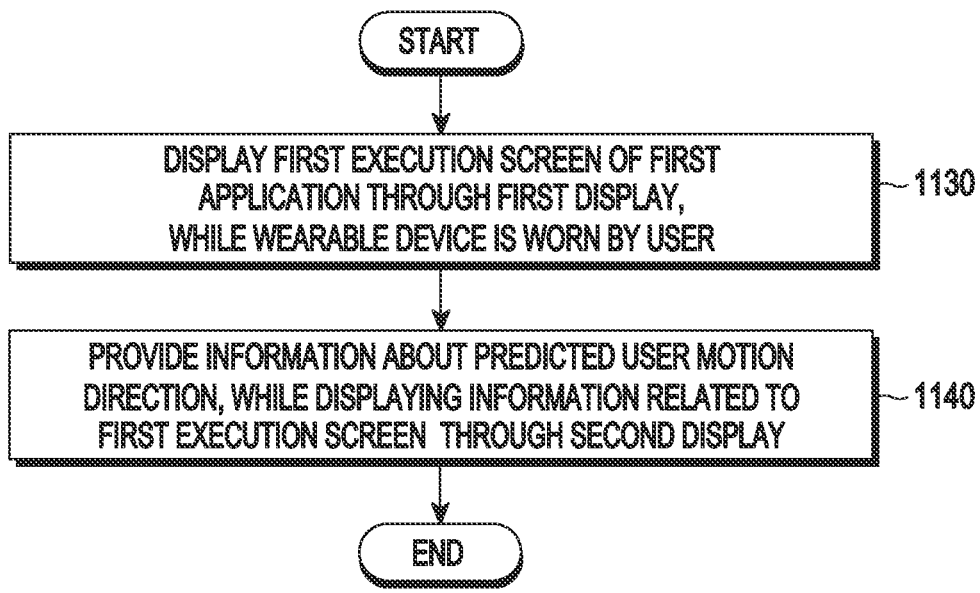
FIG. 11B is a diagram illustrating a function or operation of providing information about a direction of a predicted motion of a user through a projection module in a wearable device according to an embodiment.
Figure 12:
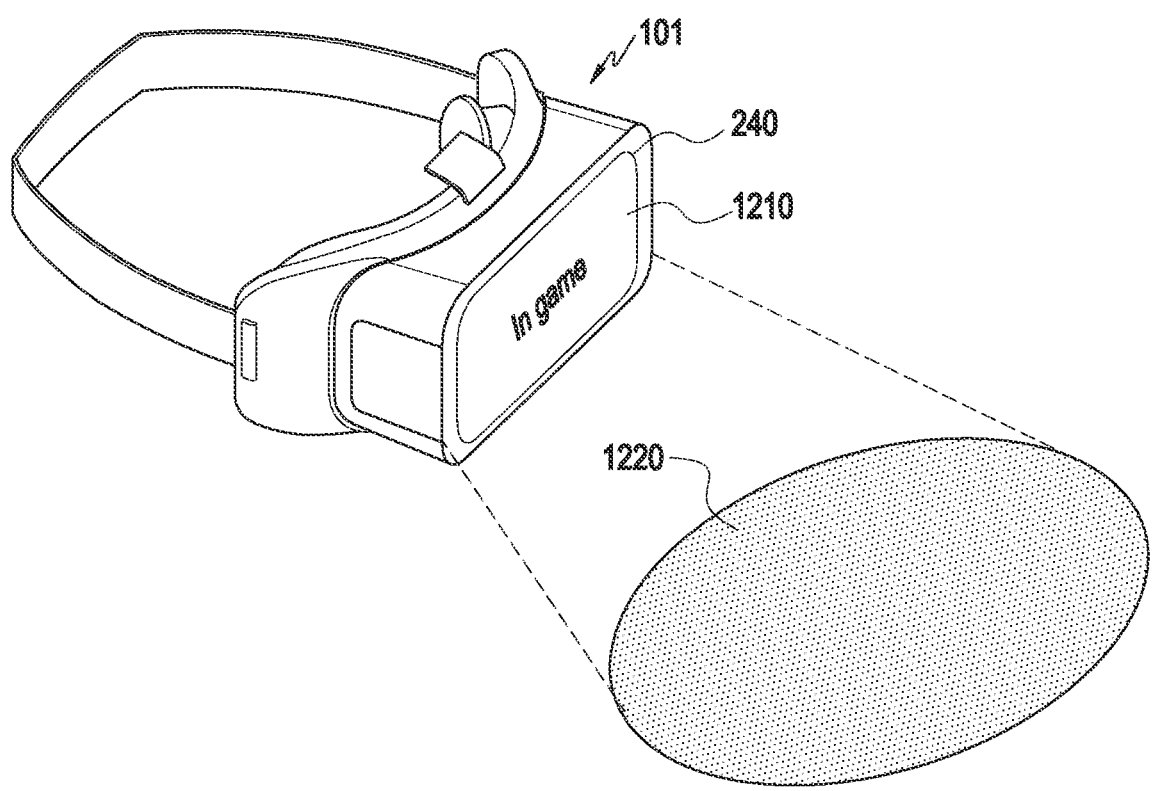
FIG. 12 is a diagram illustrating an example of the function or operation of FIG. 11A according to an embodiment.

FIG. 11A is a diagram illustrating a function or operation of providing information about a predicted motion range of a user through a projection module in a wearable device according to an embodiment. FIG. 11B is a diagram illustrating a function or operation of providing information about a predicted motion direction of a user through a projection module in a wearable device according to an embodiment. FIG. 12 is a diagram illustrating an example of the function or operation illustrated in FIG. 11A according to an embodiment.

Referring to FIG. 11A, in operation 1110, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 1120, the wearable device 200 may provide information about a predicted motion range of the user, while displaying information about the first execution screen through the second display 240. When the user is currently using an exercise (e.g., boxing) application, the wearable device 200 may control a projection module to represent information about a motion range 1220 corresponding to the type of the current exercise in an external world or real world, as illustrated in FIG. 12. The projection module may be disposed outside the wearable device 200 so that the information about the motion range 1220 is represented in a specified color in the external world or the real world. The wearable device 200 may determine the motion range 1220 based on body data input by the user and/or data specified in the application. The motion range 1220 may be determined to have a circular shape around the wearable device 200, and as shown in FIG. 12, to include a specified area in front of the wearable device 200. The wearable device 200 may display information (e.g., first information 1210 indicating a game in progress) related to the first execution screen through the second display 240, while outputting the information about the motion range 1220. According to another embodiment of the disclosure, the information on the motion range 1220 may be only processed as an area recognized by the wearable device 200, without being output.

Referring to FIG. 11B, in operation 1130, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 1140, the wearable device 200 may provide information about a predicted motion direction of the user, while displaying information about the first execution screen through the second display 240. When the user is currently using a first application (e.g., a navigation application), the wearable device 200 may control the projection module to represent information about a motion direction predicted based on a destination set by the user in an external world or real world. The projection module may be disposed outside the wearable device 200 so that the information (e.g., an arrow) about the motion direction is represented in a specified color and/or shape in the external world or the real world. When the wearable device 200 predicts that the user will move to the right within a specified time, the wearable device 200 may control the projection module to represent the information (e.g., the arrow) about the motion direction in a specified color and/or shape in the external world or the real world during the specified time. When the wearable device 200 predicts that the user will move to the right within the specified time, the wearable device 200 may display the information (e.g., the arrow) about the motion direction in the specified color and/or shape through the second display 240 during the specified time.

Figure 13:
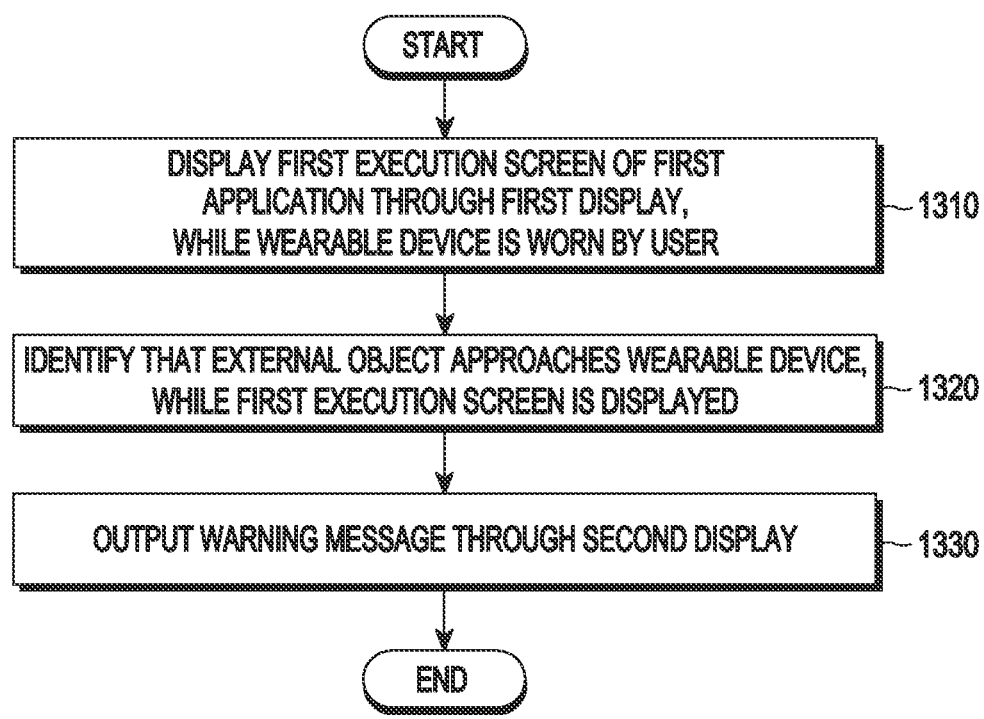
FIGS. 13 and 14 are diagrams illustrating a function or operation of outputting a warning message through a second display in a wearable device, when an external object approaches the wearable device, according to an embodiment.
Figure 14:
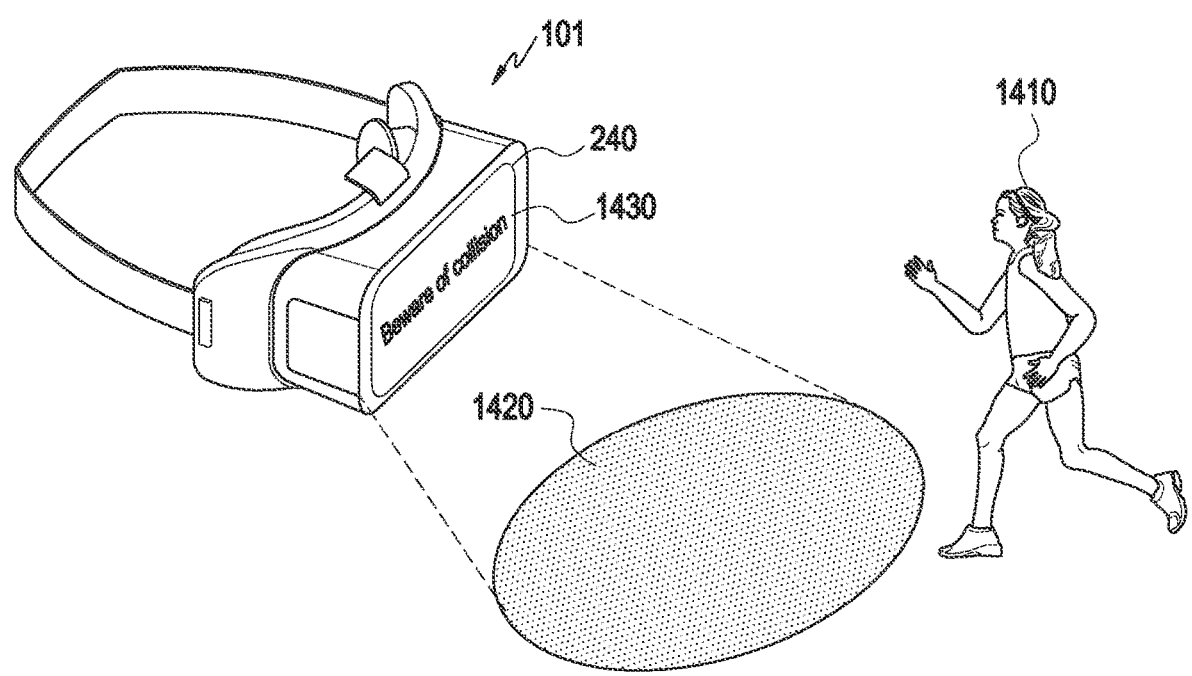

FIGS. 13 and 14 are diagrams illustrating a function or operation of outputting a warning message 1430 through the second display 240 when an external object approaches the wearable device 200 in the wearable device 200 according to an embodiment.

Referring to FIG. 13, in operation 1310, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 1320, the wearable device 200 may identify that an external object (e.g., an external user) approaches the wearable device 200, while displaying the first execution screen. The wearable device 200 may identify that the external object approaches the wearable device 200 (e.g., the external object enters a safety area 1420 or it is expected that the external object will enter the safety area 1420 within a specified time) using the at least one proximity sensor provided in the wearable device 200. The wearable device 200 may identify that the external object approaches the wearable device 200 further based on an image obtained by the at least one camera. The wearable device 200 may set the safety area 1420 around the wearable device 200. The safety area 1420 may be determined to have a circular shape around the wearable device 200, and as illustrated in FIG. 14, to include a specified area in front of the wearable device 200. The safety area 1420 may be determined based on a user input. Alternatively, the safety area 1420 may be determined by the wearable device 200 based on an application being executed. For example, when the application being executed is an exercise (e.g., running) application, the wearable device 200 may determine the safety area 1420 to include a specified area in front of the wearable device 200. The safety area 1420 may be specified by a manufacturer or provider of an application. Information about the safety area 1420 may be represented in the external world or the real world through the projection module, as illustrated in FIG. 14. Alternatively, the information about the safety area 1420 may not be displayed. The size, display position, and/or shape of the safety area 1420 may be changed and displayed according to a predicted motion of the user wearing the wearable device 200. According to an embodiment of the disclosure, when predicting that a motion speed of a body part of the user wearing the wearable device 200 will increase from a current motion speed according to settings of the application (e.g., the running application) and/or a current physical condition of the user, the wearable device 200 may display the safety area 1420 in a size larger than a current size of the displayed safety area 1420. According to an embodiment of the disclosure, when predicting that a motion range of a body part of the user wearing the wearable device 200 will be widened according to settings of an application (e.g., a game application) and/or the current physical condition of the user, the wearable device 200 may display the safety area 1420 in a size larger than the current size of the displayed safety area 1420. According to an embodiment of the disclosure, when predicting that a motion direction of the user wearing the wearable device 200 will be changed according to the settings of the application (e.g., the running application and/or the game application) and/or the current physical condition of the user, the wearable device 200 may change the display position of the safety area 1420 according to the predicted motion direction and display the safety area 1420 at the changed display position.

In operation 1330, the wearable device 200 may output the warning message 1430 through the second display 240. As illustrated in FIG. 14, the wearable device 200 may output the warning message 1430 indicating "beware of collision".

Figure 15:
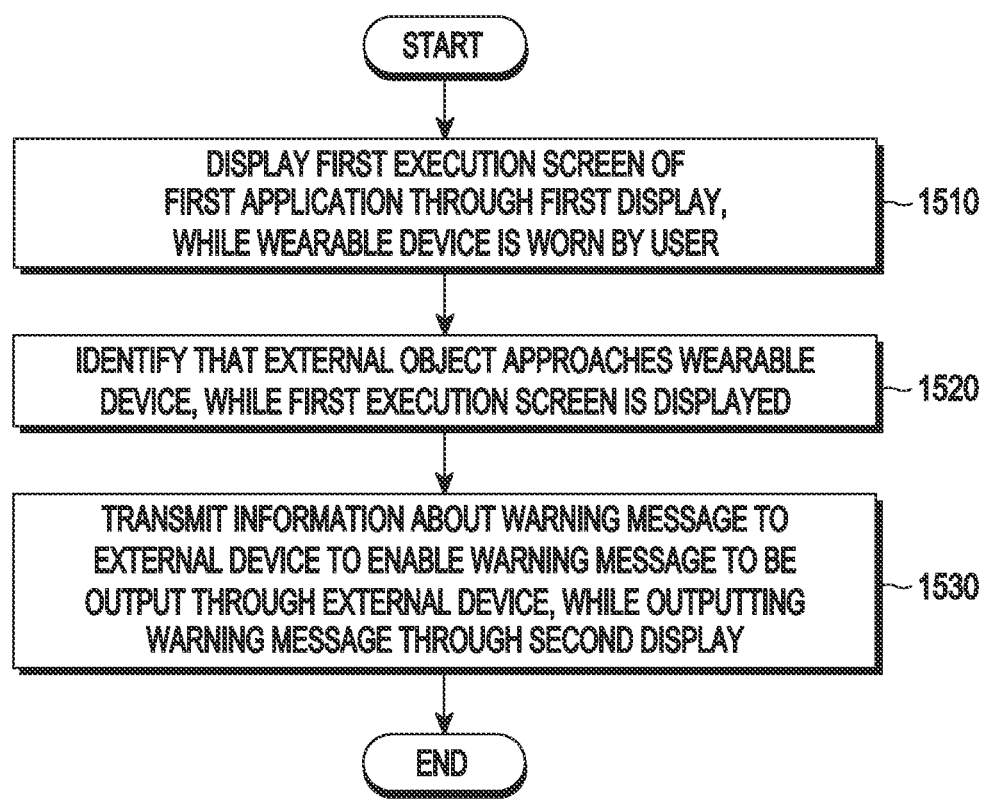
FIGS. 15 and 16 are diagrams illustrating a function or operation of transmitting a warning message to an external electronic device in a wearable device according to an embodiment.
Figure 16:
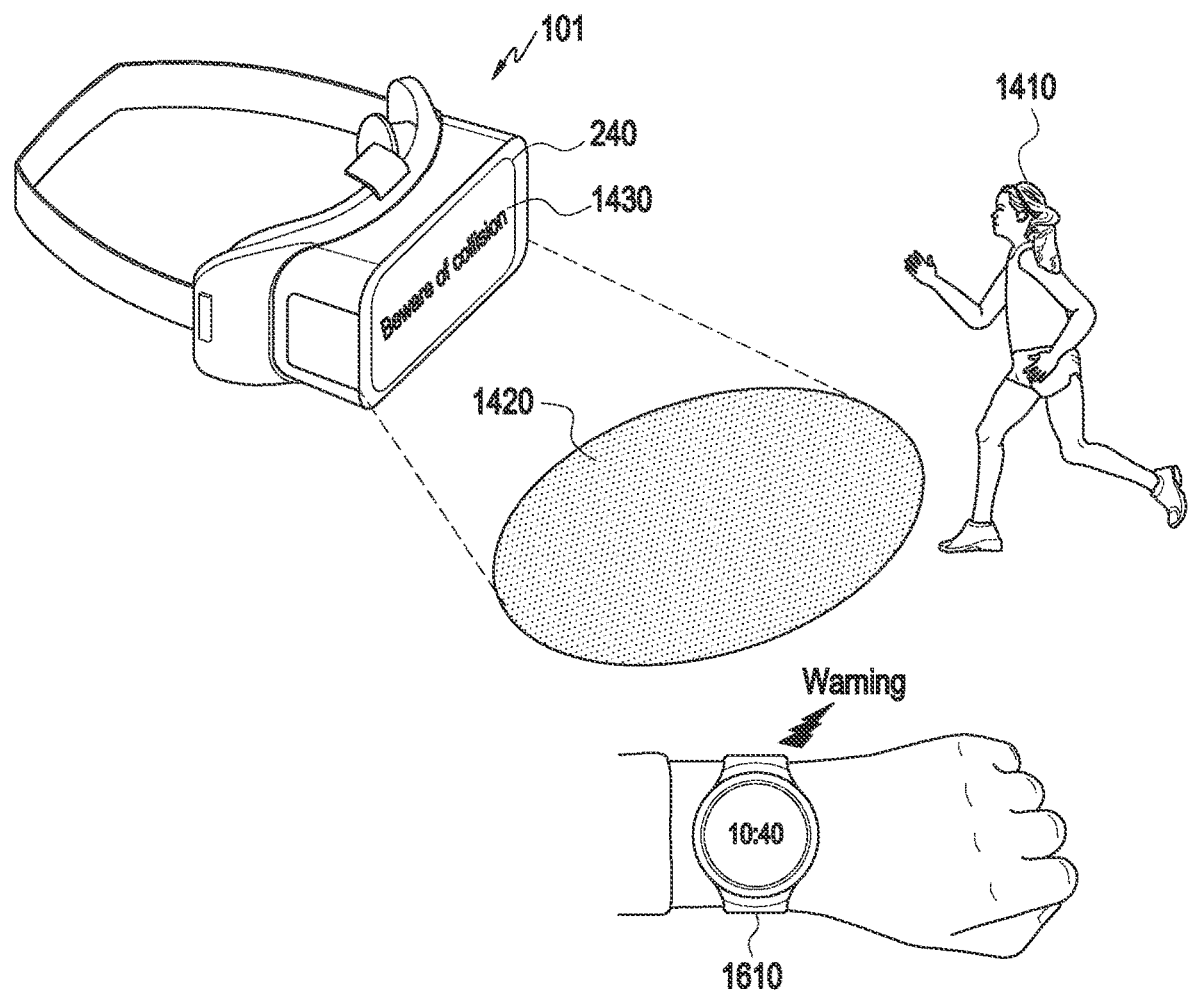

FIGS. 15 and 16 are diagrams illustrating a function or operation of transmitting the warning message 1430 to the external electronic device 1610 by the wearable device 200 according to an embodiment.

Referring to FIG. 15, in operation 1510, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 1520, the wearable device 200 may identify that an external object (e.g., an external user) approaches the wearable device 200, while displaying the first execution screen. The wearable device 200 may identify that the external object approaches the wearable device 200 using the at least one proximity sensor provided in the wearable device 200. The wearable device 200 may identify that the external object approaches the wearable device 200 further based on an image obtained by the at least one camera. The wearable device 200 may set the safety area 1420 around the wearable device 200. The safety area 1420 may be determined to have a circular shape around the wearable device 200, and as illustrated in FIG. 14, to include a specified area in front of the wearable device 200.

In operation 1530, the wearable device 200 may transmit information related to the warning message 1430 to the external electronic device 1610 so that the external electronic device 1610 displays the warning message 1430, while displaying the warning message 1430 through the second display 240. The external electronic device 1610 may be operably connected to the wearable device 200 through short-range communication or the like. The wearable device 200 may transmit the information related to the warning message 1430 to the external electronic device 1610 so that the external electronic device 1610 outputs the warning message 1430, as illustrated in FIG. 16. The external electronic device 1610 (e.g., a smart watch) may output the warning message 1430 based on the information obtained from the wearable device 200. The external electronic device 1610 may output the warning message 1430 through a visual, auditory, and/or tactile method.

Figure 17:
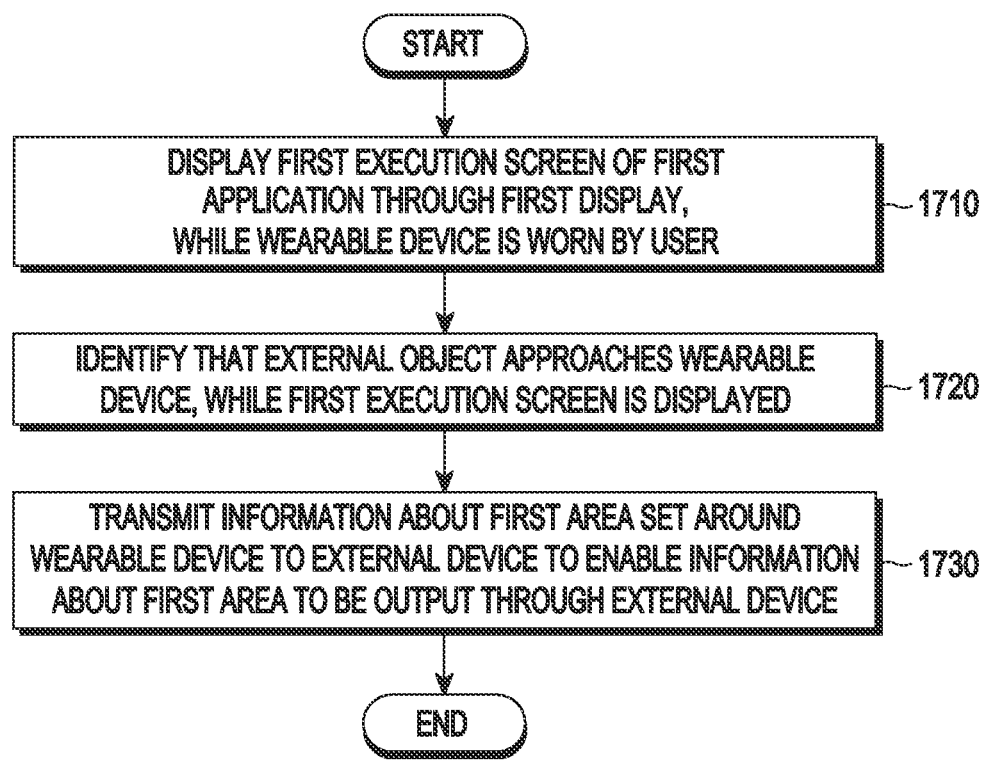
FIGS. 17 and 18 are diagrams illustrating a function or operation of transmitting information about a safety zone (e.g., a first area) to an external electronic device to output the information about the safety zone through the external electronic device in a wearable device according to an embodiment.
Figure 18:
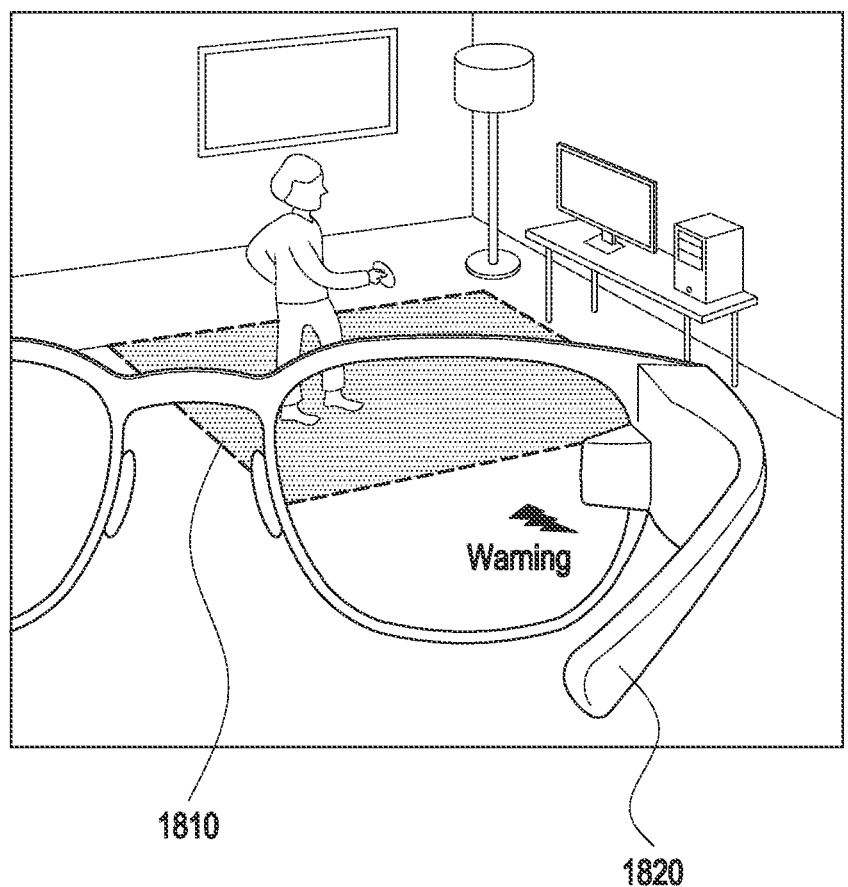

FIGS. 17 and 18 are diagrams illustrating a function or operation of transmitting information about the safety area 1420 to the external electronic device 1610 (e.g., augmented reality (AR) glasses 1820) by the wearable device 200 according to embodiment, so that the information is output through the external electronic device 1610.

Referring to FIG. 17, in operation 1710, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 1720, the wearable device 200 may identify that an external object (e.g., an external user) approaches the wearable device 200, while displaying the first execution screen. The wearable device 200 may identify that the external object approaches the wearable device 200 using the at least one proximity sensor provided in the wearable device 200. The wearable device 200 may identify that the external object approaches the wearable device 200 further based on an image obtained by the at least one camera. The wearable device 200 may set the safety area 1420 around the wearable device 200. The safety area 1420 may be determined to have a circular shape around the wearable device 200, and as illustrated in FIG. 14, to include a specified area in front of the wearable device 200.

In operation 1730, the wearable device 200 may transmit information about a first area 1810 to the external electronic device 1610, so that the information is output through the external electronic device 1610. As shown in FIG. 18, the first area 1810 may comprise at least a portion of an environment external to the wearable device. The external electronic device 1610 may include the AR glasses 1820. The wearable device 200 may transmit the information about the first area 1810 to the external electronic device 1610, so that the information about the first area 1810 (e.g., the safety area 1420) is viewed as AR to an external user. The external electronic device 1610 may provide the information about the first area 1810 (e.g., the safety area 1420) as AR to the external user. When the external user enters the first area 1810 (e.g., the safety area 1420) or when it is expected that the user will enter the first area 1810, the wearable device 200 may output the warning message 1420 through the external electronic device 1610.

Figure 19:
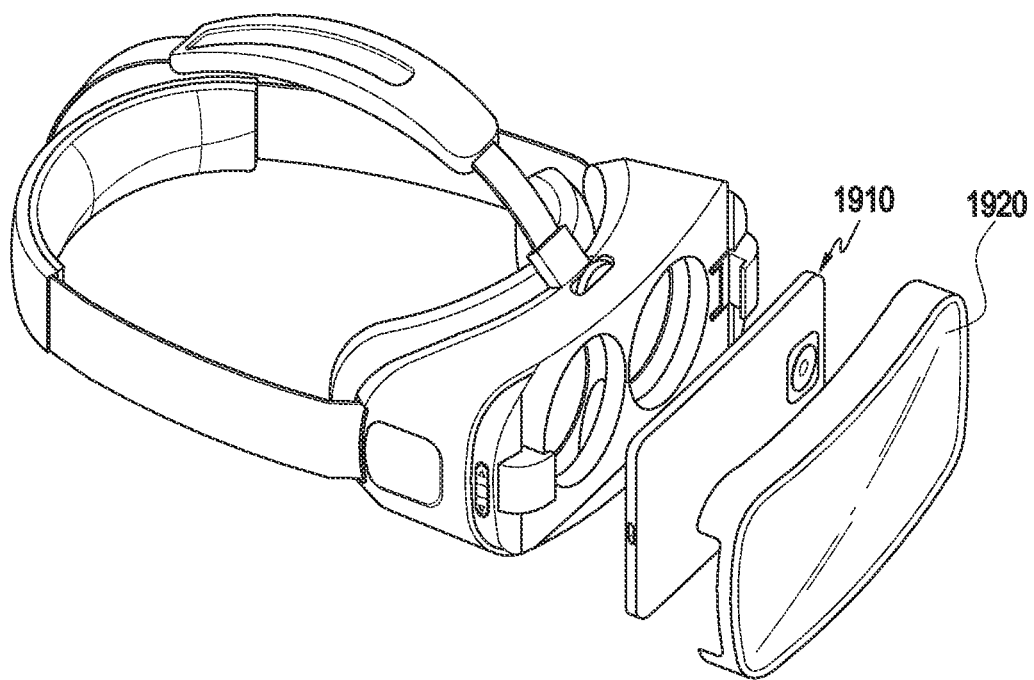
FIG. 19 is a diagram illustrating a wearable device according to an embodiment.

FIG. 19 is a diagram illustrating the wearable device 200 according to another embodiment. Referring to FIG. 19, the wearable device may be operably connected to a main device 1910. In this case, various embodiments of the disclosure may be implemented or performed through the main device 1910. The wearable device 200 according to another embodiment of the disclosure may include a protective cover 1920 including a second display. The protective cover 1920 according to another embodiment of the disclosure may be implemented to be detachable from the body of the wearable device 200.

Figure 20:
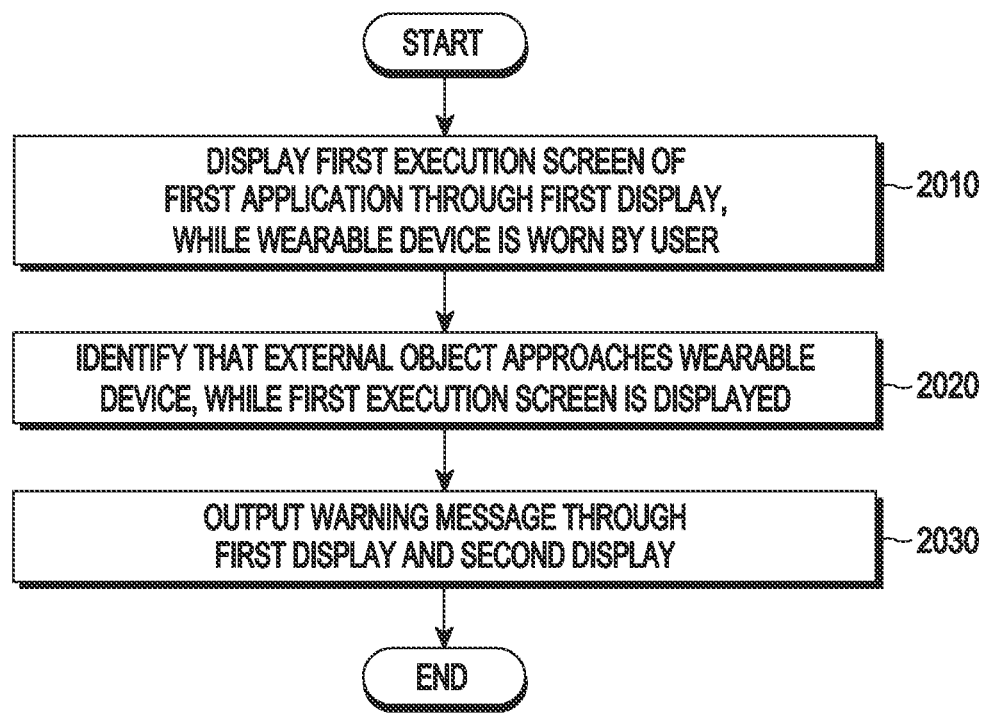
FIG. 20 is a diagram illustrating a function or operation of outputting a warning message through a first display and a second display in a wearable device, when an external object approaches the wearable device, according to an embodiment.

FIG. 20 is a diagram illustrating a function or operation of outputting a warning message through the first display 208 and the second display 240 by the wearable device according to embodiment, when an external object (e.g., an external user) approaches the wearable device 200.

Referring to FIG. 20, in operation 2010, the wearable device 200 may display a first execution screen of a first application through the first display 208, while the wearable device 200 is worn by the user. As illustrated in FIG. 2C, the wearable device 200 may provide a first execution screen for providing virtual reality through the first display 208. The wearable device 200 may include at least one proximity sensor for determining whether the user wears the wearable device 200. The wearable device 200 may determine whether the user wears the wearable device 200 based on data sensed through the at least one proximity sensor. When determining that the user wears the device, the wearable device 200 may display a specified screen (e.g., a preset home screen) through the first display 208. The first application may include various applications such as an Internet application and a video application.

In operation 2020, the wearable device 200 may identify that an external object (e.g., an external user) approaches the wearable device 200, while displaying the first execution screen. The wearable device 200 may identify that the external object approaches the wearable device 200 (e.g., the external object enters the safety area 1420 or it is expected that the external object will enter the safety area 1420 within a specified time) using the at least one proximity sensor provided in the wearable device 200. The wearable device 200 may identify that the external object approaches the wearable device 200 further based on an image obtained by the at least one camera. The wearable device 200 may set the safety area 1420 around the wearable device 200. The safety area 1420 may be determined to have a circular shape around the wearable device 200, and as illustrated in FIG. 14, to include a specified area in front of the wearable device 200. The safety area 1420 may be determined based on a user input. Alternatively, the safety area 1420 may be determined by the wearable device 200 based on an application being executed. For example, when the application being executed is an exercise (e.g., running) application, the wearable device 200 may determine the safety area 1420 to include a specified area in front of the wearable device 200. The safety area 1420 may be specified by a manufacturer or provider of an application. Information about the safety area 1420 may be represented in the external world or the real world through the projection module, as illustrated in FIG. 14. Alternatively, the information about the safety area 1420 may not be displayed.

In operation 2030, the wearable device 200 may output the warning message 1430 through the first display 208 and the second display 240. The wearable device 200 may output the warning message 1430 indicating "beware of collision" through the first display 208 and the second display 240. According to an embodiment of the disclosure, the warning message 1430 displayed through the first display 208 may be output in the form of a pop-up window on the first execution screen of the first application. According to an embodiment of the disclosure, only the warning message 1430 may be displayed through the first display 208 without displaying the first execution screen of the first application.

When the wearable device 200 identifies that the external object enters the safety area 1420, it may output the warning message 1430 through the first display 208 and the second display 240. The wearable device 200 may output the warning message 1430 "beware of collision" through the second display 240. The wearable device 200 may provide a notification indicating that an external object has entered the safety area 1420 through the first display 208 in the form of a pop-up window. The wearable device 200 may provide information about the external object that has entered the safety area 1420 through the first display 208 in a video see through (VST) method. The wearable device 200 may provide the information about the external object which has entered the safety area 1420 through the second display 240 in the VST method, while providing the notification indicating that the external object has entered the safety area 1420 through the first display 208 in the form of a pop-up window. The wearable device 200 may output the warning message 1430 through the first display 208 without outputting the warning message 1430 through the second display 240. The wearable device 200 may output the warning message 1430 through the second display 240 without outputting the warning message 1430 through the first display 208. The wearable device 200 may output the warning message 1430 through the first display 208 and the second display 240.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment of the disclosure as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities, and some of the multiple entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. A wearable device comprising:
a first display provided on a first surface of the wearable device facing a face of a user when the wearable device is worn by the user;
a second display provided on a second surface of the wearable device facing an outside of the wearable device when the wearable device is worn by the user;
memory storing one or more instructions; and
at least one processor configured to execute the one or more instructions to:
display a first execution screen of a first application via the first display, while the wearable device is worn by the user,
while displaying the first execution screen via the first display, display a first type of visual notification corresponding to the first execution screen of the first application via the second display;
while displaying the first execution screen via the first display and displaying the first type of visual notification via the second display, obtain a gesture input from the user, and
based on the gesture input, display a second execution screen of the first application via the first display, and display a second type of visual notification corresponding to the second execution screen of the first application via the second display.

2. The wearable device of claim 1, wherein the first type of visual notification and the second type of visual notification are different each other.

3. The wearable device of claim 1, further comprising:
a communication module,
wherein the at least one processor is further configured to execute the one or more instructions to transmit, through the communication module, the information related to the first execution screen to an external electronic device operably connected to the wearable device to enable the information related to the first execution screen to be displayed on the external electronic device.

4. The wearable device of claim 3, further comprising:
a proximity sensor,
wherein the at least one processor is further configured to execute the one or more instructions to:
identify that an external object approaches the wearable device through the proximity sensor, and
display a warning message on the second display based on the identification of the external object.

5. The wearable device of claim 4, wherein the at least one processor is further configured to execute the one or more instructions to:
identify that the external object approaches the wearable device through the proximity sensor, and
transmit, through the communication module, information about the warning message to the external electronic device operably connected to the wearable device, based on the identification of the external object to enable the warning message to be output through the external electronic device.

6. The wearable device of claim 3, wherein the at least one processor is further configured to execute the one or more instructions to:
transmit information about a first area in an external environment of the wearable device to the external electronic device operably connected to the wearable device to enable the information about the first area to be output through the external electronic device.

7. The wearable device of claim 1, wherein the at least one processor is further configured to execute the one or more instructions to:
obtain information about an emotional expression of the user wearing the wearable device through at least one sensor; and
display a visual object corresponding to the emotional expression of the user on the second display.

8. The wearable device of claim 1, wherein the at least one processor is further configured to execute the one or more instructions to:
display information about at least one item obtained through the first application by the user on the second display.

9. The wearable device of claim 1, further comprising:
a projection module,
wherein the at least one processor is further configured to execute the one or more instructions to provide information about a predicted user motion range through the projection module, while displaying the information related to the first execution screen on the second display.

10. The wearable device of claim 9, wherein the at least one processor is further configured to execute the one or more instructions to:
provide information about a predicted user motion direction through the projection module, while displaying the information related to the first execution screen on the second display.

11. A method comprising:
displaying a first execution screen of a first application via a first display of a wearable device, while the wearable device is worn by a user;
while displaying the first execution screen via the first display, displaying a first type of visual notification corresponding to the first execution screen of the first application via a second display of the wearable device;
while displaying the first execution screen via the first display and displaying the first type of visual notification via the second display, obtaining a gesture input from the user; and
based on the gesture input, displaying a second execution screen of the first application via the first display, and displaying a second type of visual notification corresponding to the second execution screen of the first application via the second display.

12. The method of claim 11, wherein the first type of visual notification and the second type of visual notification are different each other.

13. The method of claim 11, further comprising:
transmitting the information related to the first execution screen to an external electronic device operably connected to the wearable device through a communication module of the wearable device to enable the information related to the first execution screen to be displayed on the external electronic device.

14. The method of claim 11, further comprising:
obtaining information about an emotional expression of the user wearing the wearable device through at least one sensor; and
displaying a visual object corresponding to the emotional expression of the user on the second display.

15. The method of claim 11, further comprising:
displaying information about at least one item obtained through the first application by the user on the second display.

16. The method of claim 11, further comprising:
providing information about a predicted user motion range through a projection module of the wearable device, while displaying the information related to the first execution screen on the second display.

17. The method of claim 11, further comprising:
providing information about a predicted user motion direction through a projection module, while displaying the information related to the first execution screen on the second display.

18. The method of claim 11, further comprising:
identifying that an external object approaches the wearable device through a proximity sensor of the wearable device; and
displaying a warning message on the second display based on the identification of the external object.

19. The method of claim 11, further comprising:
identifying that an external object approaches the wearable device through a proximity sensor of the wearable device; and
transmitting information about a warning message to an external electronic device operably connected to the wearable device through a communication module of the wearable device, based on the identification of the external object to enable the warning message to be output through the external electronic device.

20. A non-transitory storage medium storing one or more programs, the one or more programs comprising executable instructions configured to, when executed by at least one processor of a wearable device, cause the electronic device to:
display a first execution screen of a first application via a first display of the wearable device, while the wearable device is worn by the user,
while displaying the first execution screen via the first display, display a first type of visual notification corresponding to the first execution screen of the first application via a second display of the wearable device;
while displaying the first execution screen via the first display and displaying the first type of visual notification via the second display, obtain a gesture input from the user, and
based on the gesture input, display a second execution screen of the first application via the first display, and display a second type of visual notification corresponding to the second execution screen of the first application via the second display.

* * * * *